No. 738,397. PATENTED SEPT. 8, 1903.
J. A. BESSON.
APPARATUS FOR TREATING SUGAR JUICE.
APPLICATION FILED OCT. 1, 1900.
NO MODEL.
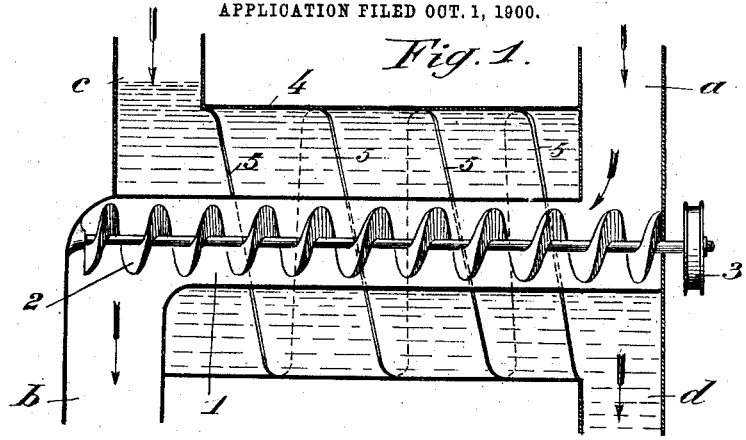
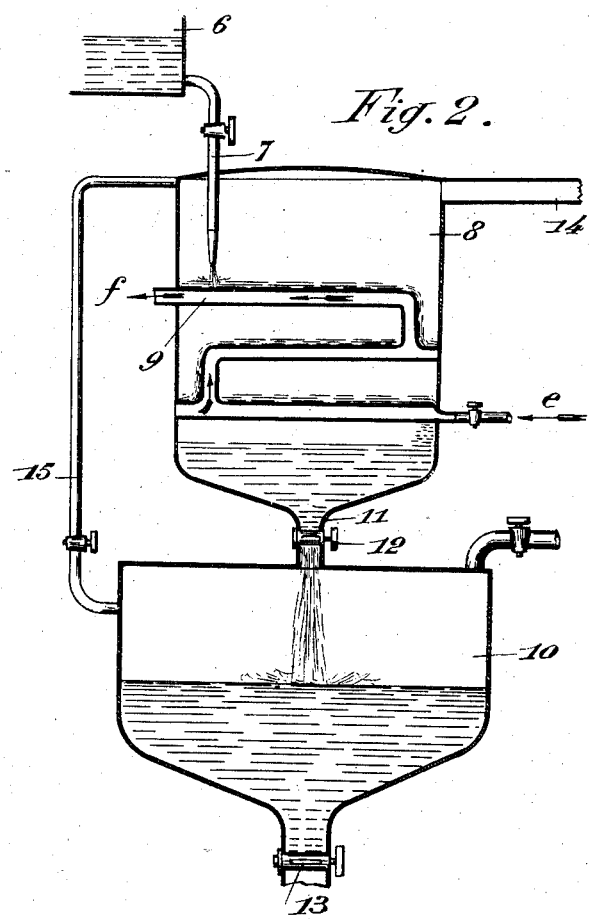
Witnesses:
J. W. McMahon.
L. M. Shireman.
Jules Adolphe Besson, Inventor,
by B. Singer, Att'y.

No. 738,397. Patented September 8, 1903.

UNITED STATES PATENT OFFICE.

JULES ADOLPHE BESSON, OF CAEN, FRANCE.

APPARATUS FOR TREATING SUGAR-JUICE.

SPECIFICATION forming part of Letters Patent No. 738,397, dated September 8, 1903.

Application filed October 1, 1900. Serial No. 31,670. (No model.)

*To all whom it may concern:*

Be it known that I, JULES ADOLPHE BESSON, a citizen of the Republic of France, and a resident of Caen, France, have invented certain new and useful Improvements in Apparatus for Treating Sugar-Juice, of which the following is a specification.

My present invention relates to an improved apparatus for treating sugar-juice.

In the treating of sugar-juice after the clarifying thereof by means of lime, baryta, &c., a small quantity of metallic carbid—such as calcium carbid, barium, magnesium, &c.—capable of producing acetylene is desirable, thereby providing an intense reducing and purifying action on the juice. As the formation of acetylene produces heat the introduction takes place under the action of a cold temperature. Then the product is carbonated thoroughly and filtered. To this filtered mass is added successively a small quantity of oxalic acid and pulverulent metal. The temperature is then slowly raised, whereby the liquid is decolorized. Then the liquid is again filtered and concentrated.

The present invention resides in the provision of an apparatus whereby the sugar-juice may be treated in the above-specified manner without deteriorating the juice and producing thereby the desired result; and it consists in the improved construction and combination of parts hereinafter described and claimed.

In the drawings, Figure 1 is a sectional view showing the cooling device used during the formation of the acetylene, and Fig. 2 is a similar view of the apparatus used after the oxalic acid and pulverulent metal is introduced.

Referring to Fig. 1, the juice enters the casing 1 at $a$ and is discharged at $b$ in a partially frozen state after being forced forward by the screw 2, actuated by means of the pulley 3, connected to any suitable power. The casing 1 is surrounded by an outer casing 4, receiving any cooling liquid at $c$, said liquid being caused to travel in a direction opposite to the direction of the juice by means of a spiral wall 5, arranged within said casing 4. The cooling liquid is discharged at $d$. By this means the tendency of raising the temperature due to the formation of the acetylene is overcome, and after the juice has been treated to a sufficient degree it is passed into the reservoir 6. (Shown in Fig. 2 and forming a part of the apparatus.) The partial cooling or congelation may be repeated several times, and the cold liquid serves to condense the vapors produced in the hot concentration.

The apparatus in which the syrup is heated comprises a feed-reservoir 6, provided with a valved pipe 7, extending downwardly into a boiler 8, containing a plurality of hollow plates 9, arranged in vertical succession and having communication with each other, as shown, and through which steam, hot gas, &c., is forced in the direction indicated by $e\,f$. The juice flows from the reservoir 6 through the pipe 7 and drops in thin strata upon the heated plates 9, where it is concentrated and is afterward collected in a reservoir 10. The connection 11 between the boiler 8 and the reservoir 10 is provided with a valve or equivalent 12, whereby the passage of liquid through said connection may be temporarily intercepted when it is desired to discharge the juice from the reservoir 10 through the valve 13. The boiler 8 is provided with an outlet 14 for the escape of vapors, while the vapors contained in the reservoir 10 pass through a valved pipe 15 upward into the top part of the boiler 8.

I may combine together a plurality of boilers such as described, so that the vapors produced in one boiler may be employed for heating the next boiler.

Having fully described my invention, what I claim, and desire to secure by Letters Patent, is—

1. An apparatus for concentrating sugar-juice, comprising an inner casing to receive the prepared juice, a rotary screw to force the juice through said casing, an outer casing inclosing the said inner casing and provided with an interior spiral wall to conduct the cooling agent through the outer casing and about the inner casing, a reservoir into which the juice is discharged, a boiler into which the reservoir discharges, a plurality of hollow plates arranged in vertical series and having communication with each other, means to force a heating medium through the hollow plates, a reservoir below the boiler, having communication therewith, and a valve in the bottom of the reservoir to regulate the flow therefrom, substantially as described.

2. The combination, in an apparatus for the purpose set forth, of a reservoir, a boiler having a vapor-outlet pipe 14, a feed-pipe leading from the reservoir into the boiler, a plurality of flat hollow plates within the boiler arranged one above the other and having communication one with the other, means to force a heating medium through the hollow plates, a reservoir below the boiler, a pipe communicating between the boiler and the lower reservoir, and a vapor-pipe 15, leading from the lower reservoir 10 and opening into the upper portion of the boiler, substantially as described.

In testimony whereof I have hereunto set my hand in presence of two witnesses.

JULES ADOLPHE BESSON.

Witnesses:
   ADOLPHE SHIRM,
   EDWARD P. MACLEAN.